J. F. PARROTT.
DIFFERENTIAL GEARING.
APPLICATION FILED MAR. 4, 1914.

1,162,097.

Patented Nov. 30, 1915.
2 SHEETS—SHEET 1.

WITNESSES.
Wm. P. Schmitt
Cecil Long

INVENTOR
John F. Parrott.
BY
ATTORNEY

J. F. PARROTT.
DIFFERENTIAL GEARING.
APPLICATION FILED MAR. 4, 1914.

1,162,097.

Patented Nov. 30, 1915.
2 SHEETS—SHEET 2.

WITNESSES:
Wm. P. Schmitt
Cecil Long

INVENTOR
John F. Parrott.
BY
J. J. Geisler
ATTORNEY

UNITED STATES PATENT OFFICE.

JOHN F. PARROTT, OF PORTLAND, OREGON, ASSIGNOR OF ONE-HALF TO G. P. HENDERSON, OF PORTLAND, OREGON.

DIFFERENTIAL GEARING.

1,162,097. Specification of Letters Patent. Patented Nov. 30, 1915.

Application filed March 4, 1914. Serial No. 822,535.

*To all whom it may concern:*

Be it known that I, JOHN F. PARROTT, a citizen of the United States, and a resident of the city of Portland, county of Multnomah, State of Oregon, have invented a new and useful Improvement in Differential Gearing, of which the following is a specification.

My invention relates to the transmission mechanism of motor driven vehicles and has particularly to do with the differential gearing which permits the driven wheels to revolve independently of each other, as required in rounding a curve. While any of the well known forms of the differential gear permits such independent rotation, often times when the vehicle runs through a mud hole one wheel will slip, in which case the other wheel will idle and become useless as far as traction is concerned.

One of the main objects of my invention is to provide devices which will maintain the driving strain on both wheels though permitting one wheel to run faster than the other. To this end my devices are so contrived that when the vehicle is going around a curve, and the inside driven wheel slips, the driving strain will be instantly transmitted to the outside idling wheel; and when the vehicle is on a straightway, both wheels being driven, and one wheel slips, the driving strain will be maintained steadily on both wheels, instead of allowing the non-slipping wheel to idle. The increased traction will then assist in pulling the vehicle out of the hole.

A further object of my invention is to provide improved means for automatically reversing the driving connections between the differential and the rear axle whenever the engine is reversed.

Figures 1, 2:
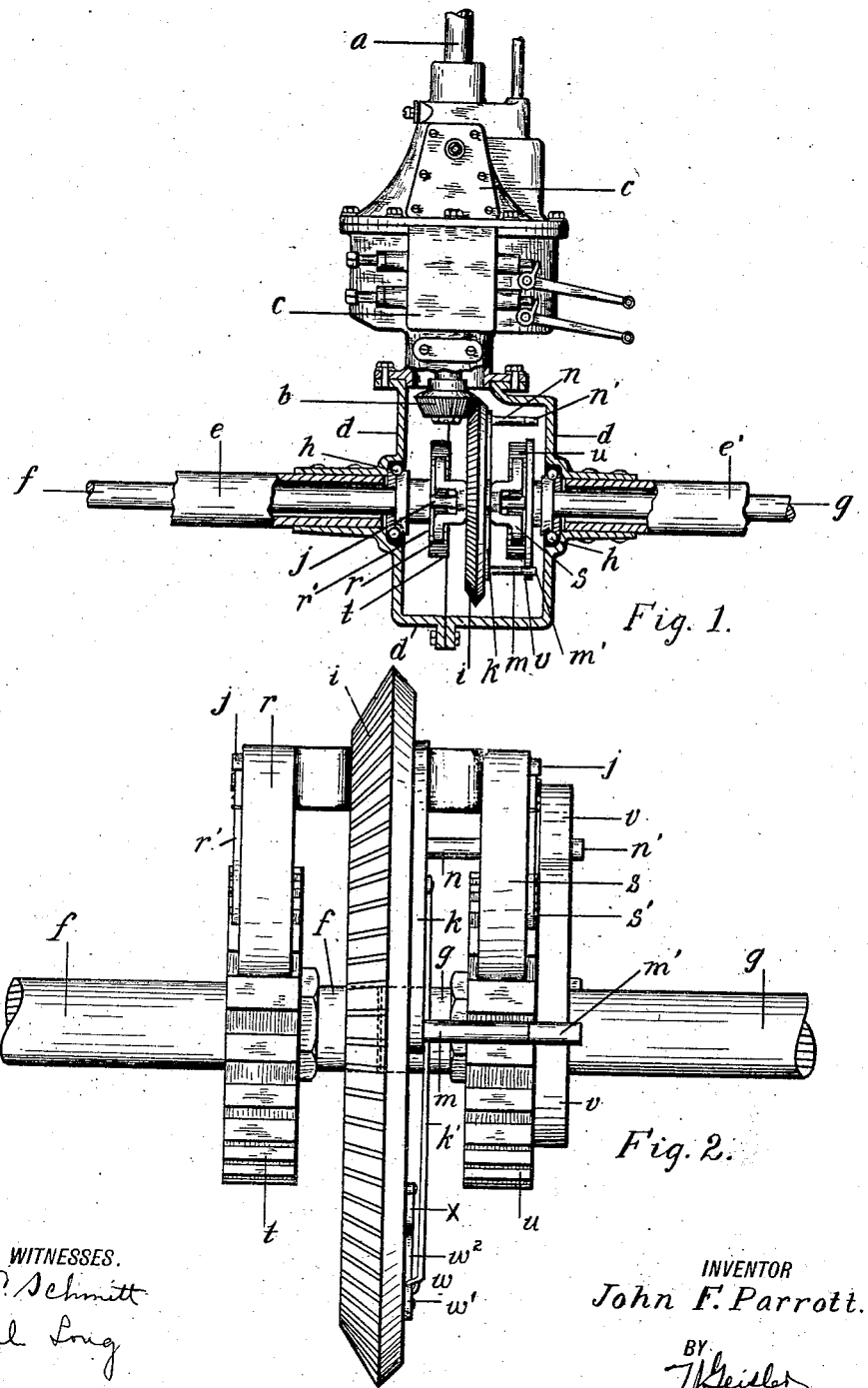
Figure 3:
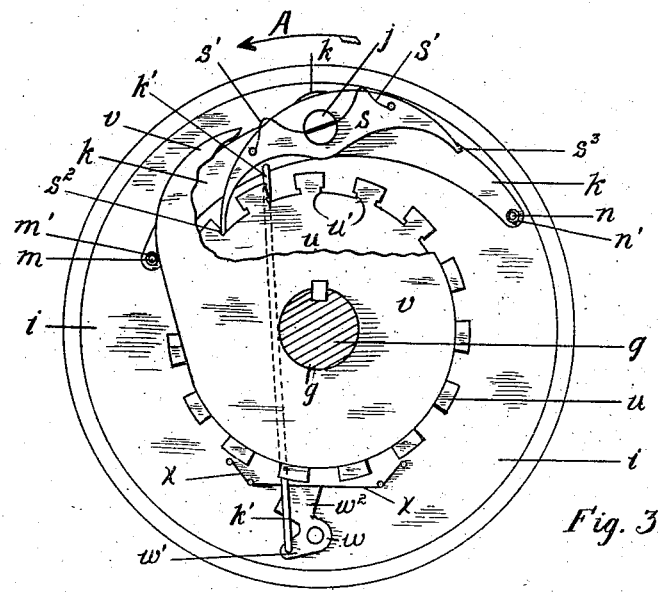
Figure 4:
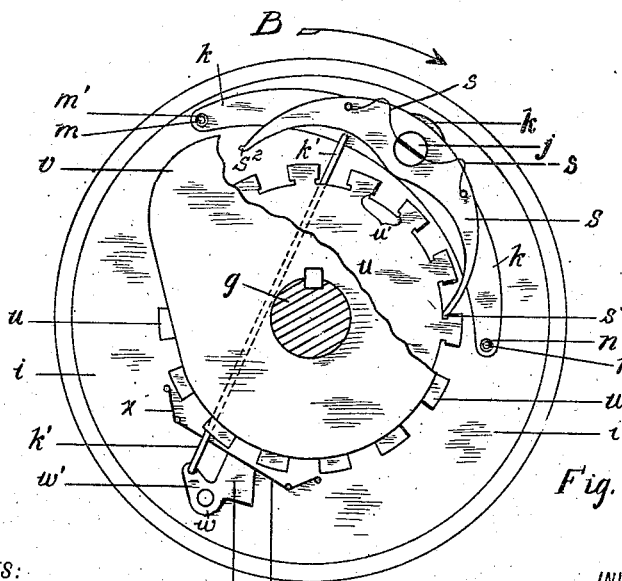

The details of my invention are fully shown in the accompanying drawings, in which:

Figure 1 is a plan view of a part of the transmission mechanism embodying my invention; a portion of the differential case is broken away so as to show the relative arrangement of the inner parts; Fig. 2 is a rear elevation, on a larger scale, of my improvement in differential gearing; Fig. 3 is a side elevation, slightly reduced, of the parts shown in Fig. 2; the parts are arranged so as to rotate the divided jack shaft or rear axle in counter-clockwise direction, as indicated by the arrow; and Fig. 4 is another view of the parts shown in Fig. 3. In this view the engine has been reversed and the parts are shown in position to drive the divided jack shaft clockwise.

I have illustrated my invention as used on the jack-shaft of an automobile truck, but of course the same may also be used on the rear axle of any motor driven vehicle when the type of the latter will permit such location of the differential. The propeller shaft of the vehicle is represented by $a$ in Fig. 1 and has keyed on its rear end a bevel pinion $b$. Any convenient form of variable speed gearing is inclosed in the case $c$, such mechanism being shown merely for the purpose of locating the main parts of my invention. Bolted on the rear end of the case, $c$, is the differential casing $d$, and on opposite sides of the latter are the housings $e$, $e'$, of the two abutting sections, $f$, $g$, of the jack-shaft, each section being rotatably mounted on roller bearing elements $h$ in the differential gear casing. See Fig. 1. A bevel gear, $i$, is loosely journaled on the abutting ends of the jack-shaft sections, said gear meshing with and being driven by the bevel pinion $b$ of the propeller shaft $a$. A pin, $j$, is journaled in the web of said gear $i$. On the pin $j$ is rigidly mounted a double-ended rocker-arm $k$, bearing on its extremities the lateral pins $m$, $n$, and the latter bearing friction rollers $m'$, $n'$. On the opposite ends of the pin $j$ are loosely mounted the double-ended pawls, $r$, $s$, the extremities of which are made with small longitudinal toes, as shown by $s^2$, $s^3$. Restraining springs, $r'$, $s'$, are also fixed on the opposite ends of the pin $j$, and their ends are made fast to the arms of the pawls, $r$, $s$, respectively, as shown in Figs. 3 and 4. These springs are adapted to normally hold said pawls, $r$, $s$, in position on the pin $j$, at the same time permit them certain independent movement. On each of the jack-shaft sections, $f$, $g$, are keyed the ratchet wheels, $t$, $u$, adapted to be engaged by the pawls, $r$, $s$. The root of each ratchet tooth is recessed ($u'$) on both sides, as shown in Figs. 3 and 4, said recesses forming seats for said toes on the extremities of the pawls, $r$, $s$. The purpose of this construction is to prevent the working ends of the pawls from springing out of engagement with the ratchet wheels. On the jack-shaft section, $g$, adjacent the ratchet wheel $u$ is fixed a cam-plate $v$. A keeper, $w$, is pivotally mounted in the web of the gear, $i$, (see Figs. 3 and 4) at a point diametrically opposite the pin $j$. The arm $w'$ of this keeper is connected to the double-ended rocker-arm $k$ by a link $k'$, and the arm $w^2$ has a bevel face adapted to bear against a flat spring $x$, supported on the gear $i$. The spring $x$ is made relatively weaker than the spring $r^2$, for a reason to be explained later. The bevel face of the keeper $w$ is so formed that a small movement of the latter will cause the arm $w^2$ to bear against the spring $x$ to the point where the vertex of said bevel faces is slightly over center. The pressure of the spring will then throw the keeper $w$ to the position shown in Fig. 4. The rocker-arm being connected by the rod $k'$ with the keeper $w$ and the latter bearing against the spring surface $x$, when the keeper is inclined to either side it will spring over to said side and hold the rocker-arm $k$ in position. The pawls $r$, $s$, being pivoted on the axis of the rocker-arm and yieldingly connected therewith through the medium of the restraining springs $r'$, $s'$, will have a tendency to follow the movement of the rocker-arm.

Now briefly describing the action of my device, the cam plate $v$ rotates with the jack-shaft section $g$; the double-ended rocker-arm $k$ traveling with the bevel gear $i$. Assuming that the gear $i$ is being driven in the direction indicated by the arrow A in Fig. 3, both pawls $r$ and $s$ will be engaged with the respective ratchets $t$ and $u$, and the axle portions $f$ and $g$ will thereupon be driven at the same speed. If the machine turns to the left, the axle portion $f$ will be on the outside of the curve and will therefore be required to travel faster than the axle portion $g$. This faster travel will cause the pawl $r$ to idle against the action of the spring $r'$, while the pawl $s$ remains in engagement with and drives the slower running ratchet $u$. As soon as the axle portion $f$ has resumed the speed of the axle portion $g$, the pawl $r$ will spring back into working engagement with the ratchet $t$, and both axle sections will then be positively driven at the same speed. If, now, the machine turns to the right, the axle portion $g$ will be on the outside of the curve and will therefore, be required to travel faster than the axle portion $f$. This faster speed of travel will allow the pawl $s$ to idle over the faster running ratchet $u$, and the pawl $r$ will remain in engagement with and drive the slower running ratchet $t$. The faster speed of rotation of the axle portion $g$ will cause the cam $v$ to run ahead of the gear $i$ and as it passes under the roller $m$, the rocked arm $k$ will be partially rocked so that it will merely ride over the cam $v$. As soon as the cam $v$ has passed away from the roller $m$, the arm $k$ will resume its initial position as shown in Fig. 3. The reason for this return of the arm $k$ to its initial position instead of being thrown completely over center to the position shown in Fig. 4 is that the pawl $r$ remains in engagement with the slower running ratchet $t$, on account of having its toe $r^2$ engaged with the recessed portion of the tooth of said ratchet. The rotation of the pin $j$, due to such partial rocking of the arm $k$, will work against the spring $r^2$ and the latter being stronger than the spring $x$, will cause the pin $j$ and thereby the arm $k$, to return to their initial positions. It will thus be seen that when the axle portion $g$ is running faster than the axle portion $f$, the pawl $s$ and the arm $k$, will merely idle over the ratchet $u$ and cam $v$ respectively. In order that the arm $k$ will be thrown completely over center to the position shown in Fig. 4, both pawls must idle, which will only occur momentarily when the direction of rotation of the gear $i$, is reversed, and when this occurs, the spring $x$ will not be resisted by the spring $r^2$ and will, therefore, act to throw the arm $k$ completely over center when the cam $v$ partially rocks said arm.

When the vehicle is on a straightway and one of the wheels becomes mired, it will be prevented from slipping by the ratchet engagement of the other wheel. In present structures, when one wheel slips, the other remains idle, whereas in mine, the non-slipping wheel will take up the driving strain and be driven synchronously with the slipping wheel. The increased traction will then pull the vehicle over the slippery portion of road.

Another added advantage in this type of differential is that when the vehicle is coasting down a grade, the differential will automatically adjust itself to a working position. The rotation of the vehicle wheels will drive the differential gear, so that when the clutch of the propeller shaft is in engagement the latter and the engine crankshaft will be driven. In this way the engine may be cooled off and will act as a brake to retard the velocity of the vehicle.

For convenience the bevel gear $b$ is referred to in some of the claims as the primary driven gear.

I claim:

1. In power transmitting mechanism, the combination with the primary driven gear and a divided driven axle, of a driving element on each member of such divided axle, a gear loose on the divided driven axle, such gear being driven by the primary driven gear, means carried by such loose gear for engaging said driving elements of the divided axle, said means and driving elements adapted to drive the divided axle in either direction; means actuated by the rotation of said loose gear, adapted to operate said engaging means simultaneously and to thereby cause the driving of the divided axle with the loose gear; said engaging means adapted to permit the faster running member of the divided axle to run idle for the time; means on the loose gear for so operating said engaging means as to cause the driving of the members of the divided axle in the same direction as said loose gear; and means for temporarily holding said engaging means as positioned.

2. In power transmitting mechanism, the combination with the primary driven gear and a divided driven axle, of a ratchet wheel fast on each member of such divided axle, a gear loose on the divided driven axle, such gear being driven by the primary driven gear; pawl elements carried by such loose gear for engaging said ratchet wheels of the divided axle; said pawls and driving elements adapted to drive the divided axle in either direction; spring-controlled means actuated by the rotation of said loose gear adapted to operate said pawl elements simultaneously and to thereby cause the driving of the divided axle with the loose gear; said pawl elements adapted to permit the faster running member of the divided axle to run idle for the time; and means on the loose gear for so operating said pawl elements as to cause the driving of the members of the divided axle in the same direction as said loose gear.

3. In power transmitting mechanism, the combination with the primary driven gear and a divided driven axle, of a ratchet wheel fast on each member of such divided axle, a gear loose on the divided driven axle, such gear being driven by the primary driven gear; pawl elements carried by such loose gear for engaging said ratchet wheels of the divided axle; said pawls and driving elements adapted to drive the divided axle in either direction; spring-controlled means actuated by the rotation of said loose gear adapted to operate said pawl elements simultaneously and to thereby cause the driving of the divided axle with the loose gear; said pawl elements adapted to permit the faster running member of the divided axle to run idle for the time; means on the loose gear for so operating said pawl elements as to cause the driving of the members of the divided axle in the same direction as said loose gear; and means for temporarily holding said engaging means as positioned.

4. In power transmitting mechanism, the combination with the primary driven gear, of a divided driven axle, driving elements mounted thereon; a loose gear on said divided axle; a pin journaled in said loose gear and extending from its opposite faces; double-ended arms fast on the ends of said pins for engaging with said driving elements; a double-ended member pivoted over each of said arms and adapted for engaging with said driving elements; restraining springs adapted normally to cause the pivoted members to assume the inclination of said arms; projections on the extremities of said arms; a cam plate fast on the divided axle for engaging with said projections on said arms and to thereby tilt the latter; and means for temporarily holding said arms in position as tilted.

5. In power transmitting mechanism, the combination with the primary driven gear, of a divided driven axle, driving elements mounted thereon; a loose gear on said divided axle; a pin journaled in said loose gear and extending from its opposite faces; double-ended arms fast on the ends of said pins for engaging with said driving elements; a double-ended member pivoted over each of said arms and adapted for engaging with said driving elements; restraining springs adapted normally to cause the pivoted members to assume the inclination of said arms; projections on the extremities of said arms; a cam plate fast on the divided axle for engaging with said projections on said arms and to thereby tilt the latter; means for preventing the disengagement of the working ends of the pawls from the ratchet wheels until the tilting of the pawls; and means for temporarily holding said arms in position as tilted.

6. In power transmitting mechanism, the combination with the primary driven gear, of a divided driven axle, ratchet wheels mounted thereon; a loose gear on said divided axle; a pin journaled in said loose gear and extending from its opposite faces; double-ended arms fast on the ends of said pins for engaging with said ratchet wheels; a double-ended pawl pivoted over each of said arms and adapted for engaging with said ratchet wheels; restraining springs adapted normally to cause the pawls to assume the inclination of said arms; projections on the extremities of said arms; a cam plate fast on the divided axle for engaging with said projections on said arms and to thereby tilt the latter; means for preventing the disengagement of the working ends of the pawls from the ratchet wheels until the tilting of the pawls; and means for temporarily holding said arms in position as tilted.

7. In power transmitting mechanism, the combination with a variable speed gearing, of a divided driven axle, ratchet wheels mounted thereon; a loose gear on said divided axle; a pin journaled in said loose gear and extending from its opposite faces; double-ended arms fast on the ends of said pins engaging with said ratchet wheels; a double-ended pawl pivoted over each of said arms and adapted for engaging with said ratchet wheels; restraining springs adapted normally to cause the pawls to assume the inclination of said arms; projections on the extremities of said arms; and a cam plate fast on the divided axle for engaging with said projections on said arms and to thereby tilt the latter.

8. In power transmitting mechanism, the combination with a variable speed gearing, of a divided driven axle, ratchet wheels mounted thereon; a loose gear on said divided axle; a pin journaled in said loose gear and extending from its opposite faces; double-ended arms fast on the ends of said pins for engaging with said ratchet wheels; a double-ended pawl pivoted over each of said arms and adapted for engaging with said ratchet wheels; restraining springs adapted normally to cause the pawls to assume the inclination of said arms; projections on the extremities of said arms; a cam plate fast on the divided axle for engaging with said projections on said arms and to thereby tilt the latter; and means for temporarily holding said arms in position as tilted.

9. In power transmitting mechanism, the combination with a variable speed gearing, of a divided driven axle, ratchet wheels mounted thereon, a loose gear on said divided axle, a pin journaled in said loose gear and extending from its opposite faces; double-ended arms fast on the ends of said pins for engaging with said ratchet wheels; a double-ended pawl pivoted over each of said arms and adapted for engaging with said ratchet wheels; restraining springs adapted normally to cause the pawls to assume the inclination of said arms; projections on the extremities of said arms; a cam plate fast on the divided axle for engaging with said projections on said arms and to thereby tilt the latter; means for preventing the disengagement of the working ends of the pawls from the ratchet wheels until the tilting of the pawls; and means for temporarily holding said arms in position as tilted.

JOHN F. PARROTT.

Witnesses:
 WM. C. SCHMITT,
 CECIL LONG.